R. GRACEY, Dec'd.

C. A. GRACEY, Executrix, assignor, by direct and mesne assignments, to C. B. GRACEY, W. L. GRACEY and R. S. STEPHENSON.

PROCESS OF MAKING AXLE SKEINS.

No. 10,776. Reissued Nov. 2, 1886.

Witnesses:
F. G. Kay
J. A. Cooke

Inventor.
Robert Gracey
By James F. Kay
Attorney

N. PETERS, Photo-Lithographer, Washington, D. C.

UNITED STATES PATENT OFFICE.

ROBERT GRACEY, OF PITTSBURG, PA., ASSIGNOR, BY DIRECT AND MESNE ASSIGNMENTS, TO CHARLES B. GRACEY, WILLIAM L. GRACEY, (CATHARINE A. GRACEY EXECUTRIX OF SAID WM. L. GRACEY, DECEASED,) AND ROBERT S. STEPHENSON, ALL OF ALLEGHENY, PENNSYLVANIA.

PROCESS OF MAKING AXLE-SKEINS.

SPECIFICATION forming part of Reissued Letters Patent No. 10,776, dated November 2, 1886.

Original No. 328,481, dated October 20, 1885. Application for reissue filed October 7, 1886. Serial No. 215,636.

*To all whom it may concern:*

Be it known that I, ROBERT GRACEY, a citizen of the United States, residing at Pittsburg, in the county of Allegheny and State of Pennsylvania, have invented a new and useful Process of Making Axle-Skeins, of which the following is a full, clear, and exact description, reference being had to the accompanying drawings, forming part of this specification, in which—

Figure 1:
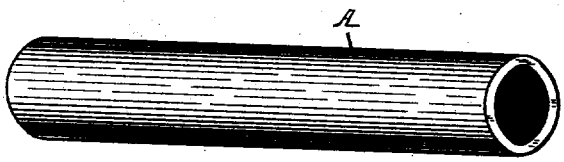
Figure 2:
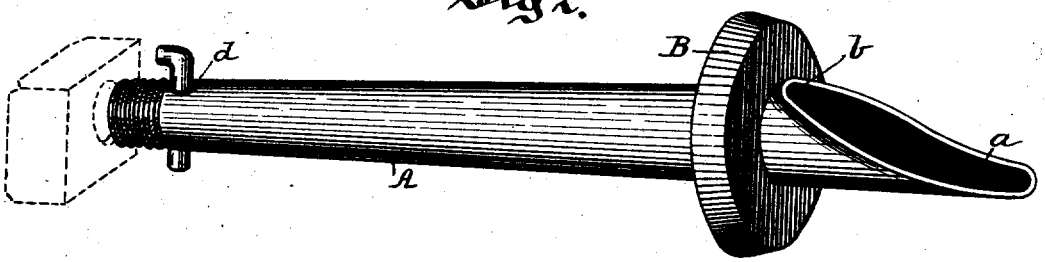

Figure 1 is a blank of metal tubing as used in my process for forming my improved axle-skein. Fig. 2 represents a perspective view of my improved axle-skein.

The object of my invention is to provide a cheap and substantial thimble or skein for axles; and my invention consists in swaging a skein from a blank of tubular material whose inside diameter is about equal to the largest exterior diameter of the axle, and then hammering the enlarged end to form a lip for securing the skein upon the axle.

In the accompanying drawings, A represents a piece of tubular material of a desired length, and whose inside diameter is about equal to the largest exterior diameter of the axle it is to protect. This piece A is the blank from which my improved skein is formed, as I will now explain.

The blank is heated and one end inserted between a pair of dies of suitable construction, and whose inside diameter at its larger end corresponds very nearly to the outside diameter of the blank. One of the dies is caused to alternately approach and recede from the blank, thereby giving the said blank a series of quick pressures which reduce its diameter, at the same time elongating the skein. At short intervals the inserted end of the blank is fed farther into the dies and turned on its axial center, and these operations repeated until the desired size and length have been obtained. The large end of the blank may now have a portion of it cut away at an angle to the main portion, and the projecting portion *a* thereby formed may be hammered or otherwise manipulated to form the lip, by means of which the skein may be secured to the axle.

In hammering the enlarged end of the blank A a shoulder, *b*, is formed, against which a shoulder on the axle abuts, and which furnishes a seat for a washer, B, which is shrunk upon the main portion of the skein. A perforation, *d*, is also made in the reduced or smaller end of the skein, through which the ordinary linchpin is inserted to secure the wheel upon the axle; or the end of the skein may be threaded and a nut employed for this purpose, as shown in the drawings.

I am thus enabled to produce an axle-skein from ordinary iron pipe at a greatly-reduced cost, and one that is superior for many reasons to the sheet-metal or cast-iron thimbles now in common use.

Having thus described my invention, what I claim as new, and desire to secure by Letters Patent, is—

1. The process herein described for forming axle-skeins, the same consisting, essentially, in placing a blank of tubular material whose inside diameter is about equal to the outside diameter of the axle between suitable dies, then swaging this blank, thereby elongating and reducing its diameter, then hammering its enlarged end to form a lip for securing it to the axle, and finally in shrinking on a washer and forming a perforation for the linchpin upon its reduced end, substantially as and for the purpose set forth.

2. As steps in the manufacture of axle-skeins, swaging between suitable dies a blank of tubular material, thereby elongating it and reducing its diameter, and then hammering its enlarged end to form a lip for securing the skein to the axle, substantially as set forth.

ROBERT GRACEY.

Witnesses:
JAMES I. KAY,
I. E. BARNES.